(12) United States Patent
Castonguay et al.

(10) Patent No.: US 7,561,279 B2
(45) Date of Patent: Jul. 14, 2009

(54) SCANNING SIMULTANEOUS PHASE-SHIFTING INTERFEROMETER

(75) Inventors: Raymond Castonguay, Tucson, AZ (US); Piotr Szwaykowski, Tucson, AZ (US)

(73) Assignee: Engineering Synthesis Design, Inc., Tucson, AZ (US)

( * ) Notice: Subject to any disclaimer, the term of this patent is extended or adjusted under 35 U.S.C. 154(b) by 0 days.

(21) Appl. No.: 11/770,582

(22) Filed: Jun. 28, 2007

(65) Prior Publication Data

US 2008/0043224 A1 Feb. 21, 2008

Related U.S. Application Data

(60) Provisional application No. 60/817,276, filed on Jun. 29, 2006.

(51) Int. Cl.
*G01B 9/02* (2006.01)
(52) U.S. Cl. ........................... 356/495; 356/511
(58) Field of Classification Search .............. 356/491, 356/492, 495
See application file for complete search history.

(56) References Cited

U.S. PATENT DOCUMENTS

| 4,583,855 | A | 4/1986 | Bareket | 356/521 |
| 5,774,224 | A * | 6/1998 | Kerstens | 356/394 |
| 6,304,330 | B1 | 10/2001 | Millerd et al. | 356/521 |
| 6,552,808 | B2 | 4/2003 | Millerd et al. | 356/521 |
| 2006/0146340 | A1 | 7/2006 | Szwaykowski et al. | 356/495 |

FOREIGN PATENT DOCUMENTS

DE  19652113  6/1998

OTHER PUBLICATIONS

Hettwer, et al. "Three channel phase-shifting interferometer using polarization-optics and a diffraction granting", Optical Engineering, Sep. 21, 1999, pp. 960-966, vol. 39.
Koliopoulos, Chris L. "Simultaneous phase shift interferometer", Advanced Optical Manufacturing and Testing II, Jan. 1992, pp. 119-127, vol. 1531, Tucson, Arizona.
Sivakumar, et al. "Large surface profile measurement with instantaneous phase-shifting interferometry", Optical Engineering, Jul. 15, 2002, pp. 367-372, vol. 42.
Schwider, "Single-frame realtime interferometer (SIFRI)", Aug. 21, 1998, pp. 1-3, http://www.optik.uni-erlangen.de/mikos/projects/sifri/sifri.htm.

* cited by examiner

*Primary Examiner*—Tarifur Chowdhury
*Assistant Examiner*—Jonathon D Cook
(74) *Attorney, Agent, or Firm*—Hayes Soloway, P.C.

(57) ABSTRACT

An optical measuring apparatus for comprising, in combination, a polarization type interferometer including a polarization type beam splitter in which a polarized beam of light is split into orthogonally polarized reference and test beams, an array of detectors arranged in a line for creating a plurality of phase shifting interferograms, and a scanning device for moving the object in a direction perpendicular to a long axis of the detectors.

20 Claims, 2 Drawing Sheets

Figure 1
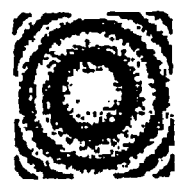
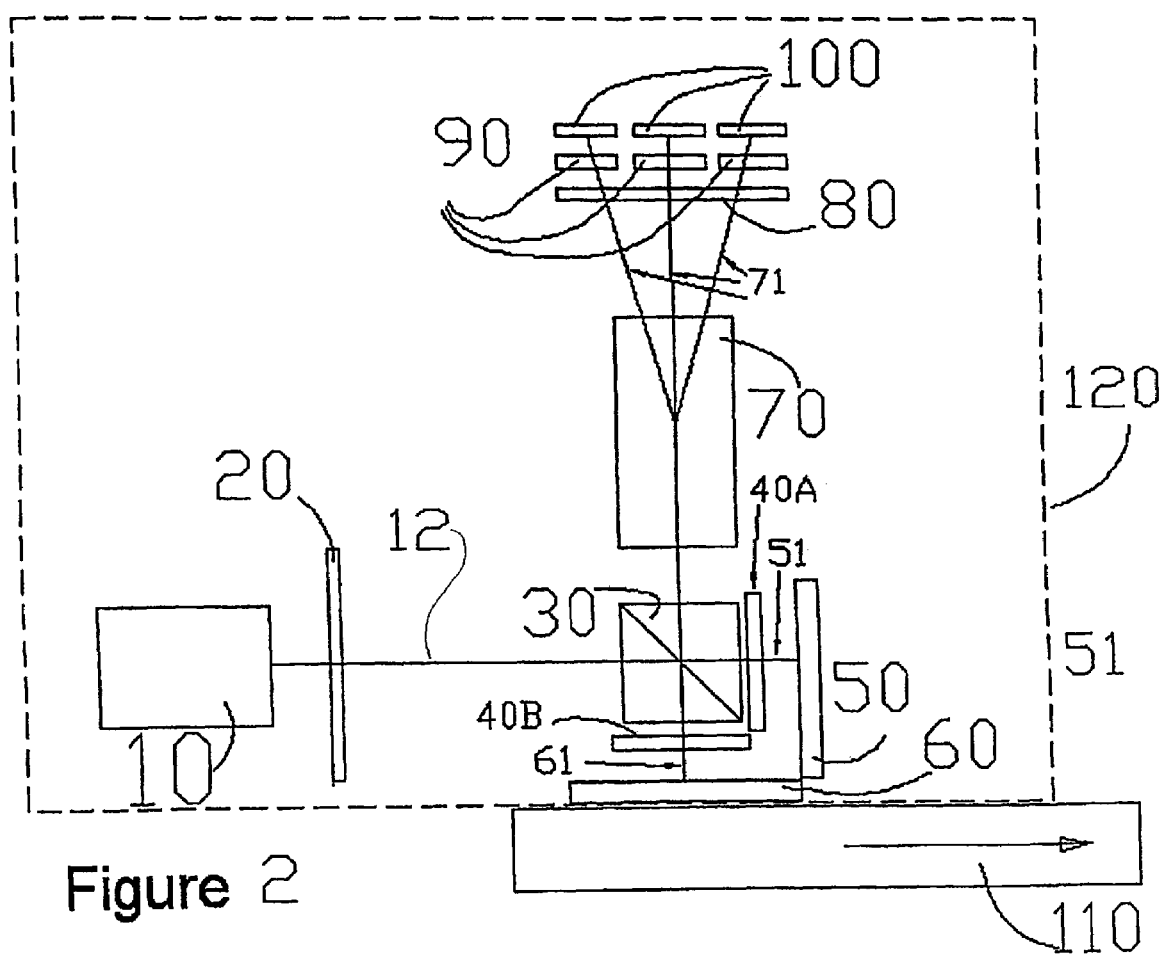
Figure 2

SCANNING SIMULTANEOUS PHASE-SHIFTING INTERFEROMETER

CROSS REFERENCE TO RELATED APPLICATION

This application claims priority from U.S. Provisional Application Ser. No. 60/817,276, filed Jun. 29, 2006, the contents of which are incorporated herein by reference.

FIELD OF THE INVENTION

The present invention relates to interferometry, in particular, interferometry involving the measuring of wavefronts through use of phase-shifted interferograms.

BACKGROUND OF INVENTION

Interferometers have been known and used for a long time. Interferometry is a widely used method for measuring surface profiles (often to nano-meter resolutions) and other physical properties of materials, gases and liquids. There are many types of interferometers, characterized by their optical designs and layouts. Some classical types are Twyman-Green, Fizeau, Michaelson, Mach-Zender, and Fabry-Perot. Each of these interferometer types produces interference patterns, called interferograms. These interferograms (see FIG. 1) can be used to analyze characteristics of an object under test.

Interferograms are generated by the interference of a test wavefront and a reference wavefront. The test and reference wavefronts typically originate from a common source and are obtained by splitting the originating wavefront. The test wavefront then obtains information about the test object by interacting with the object under test (typically by reflecting off of, or transmitting through a test object). Similarly, the reference wavefront obtains its "reference" information by interacting with a "known" reference object, such as a super polished flat glass plate. Superimposing or interfering these two wavefronts (i.e. on a flat screen, or on an image sensor such as a CCD) produces an interferogram.

Interferometers require coherent superposition of a "test beam" (of light) with a "reference beam" resulting in the formation of an interferogram in the overlapping region of the two beams. This interferogram data can then be captured using various types of detectors, such as a camera, for analysis.

The spatial distribution of intensity levels within the interference pattern (see FIG. 1) relates to differences in the phase of the test and reference wavefronts. Note that the reference wavefront is acted on by a known "measurement standard," such as an optical "reference" surface, and the test wavefront is acted on by the unknown object under test. Measuring the difference between the two wavefronts allows the test wavefront to be determined. In other words, the process is akin to comparing the "unknown" test wavefront to a "known" standard, the reference wavefront.

A single interferogram is usually insufficient to obtain the accuracy required for many applications. A variety of methods have been developed to acquire multiple phase-shifted interferograms as a means to increase accuracy and resolution of the measurement. Phase-shifting techniques require altering the phase between the two interfering wavefronts by introducing controlled phase delays between the test and reference beams. These added phase-shifts supply additional information that can be used to compute the test wavefront significantly more accurately. Almost all current techniques of phase shifting use sequential or "temporal" methods to introduce phase differences while multiple interferograms are acquired serially in time. However, in practice, these temporal methods cannot be used effectively in the presence of relatively fast changing environmental conditions (such as vibrations, air turbulences, etc), or when the object under test cannot be stabilized (i.e. vibrating), or when the object under test is in motion. For example, problems can arise because the interferometer typically acquires three to twelve frames (images) or phase shifted interferograms, (typically spaced 30 ms apart for standard video rate), and during this acquisition time (for three to twelve frames), any vibration that occurs between the test and reference object often causes measurement errors.

Thus, methods have been developed to acquire multiple phase-shifted interferograms simultaneously. These methods usually require that the reference and test beams ("beams" and "wavefronts" used interchangeably herein, with a "wavefront" being understood as propagating along the optical axis and sweeping out a volume that defines the light beam) be orthogonally polarized, thus allowing independent access to either one of these beams (such as via polarization optics), even when they are spatially overlapped. With this such access, multiple phase-shifts can be introduced simultaneously (as opposed to temporally), by retarding or advancing the phase of one beam with respect to the other. Altering the phase of a beam is typically accomplished through the use of wave plates or polarization beam splitters. In practice, this is accomplished by splitting the superimposed test and reference beams into three or more channels with each new channel having orthogonally polarized test and reference beam components. For each new channel, one of the beam components (test or reference) is then phase-shifted relative to the other beam component. This phase shift, or phase delay, is adjusted to be different in each channel. There are multiple methods for splitting the superimposed test and reference beams into multiple channels and multiple methods for phase-shifting within each channel. However, as discussed below in further detail, such known methods have disadvantages, including dissimilar beam paths attributable to different path distances and/or different optical elements.

U.S. Pat. No. 4,583,855 (Bareket) describes a Twyman-Green type interferometer with an arrangement for producing three simultaneous interferograms that are mutually phase shifted by 90.degree. with respect to each other. This system relates to the use of test and reference beams that are mutually orthogonally polarized; however, the system is substantially asymmetric. As such, the system can be difficult to align and a constant magnification in all three beam paths difficult to maintain.

A system similar to Bareket's has been described by Sivakumar, (Optical Engineering, Vol. 42 page 367), which therefore shares most of the characteristics and issues of Baraket's system. This system is also directed to fixed phase shifts between each channel.

In the publication "Simultaneous Phase Shift Interferometer" (Proc. of SPIE, Advanced Optical Manufacturing and Testing II, January 1992) by C. Koliopoulos, a polarization type Twyman-Green interferometer is described. This system is also asymmetric and has different optical path lengths. This system may also suffer from complex geometry and being a relatively large size.

A publication entitled "Real-time fringe pattern processing and its applications" (Proc. of SPIE, Vol. 2544, pp. 74-86, 1995) by S. Nakadate describes a system of linearly cascaded, non-polarizing beamsplitters and a reflector. This system of beamsplitters is substantially asymmetric and non-standard.

In a real world application, where imaging optics are present to image the object onto the cameras, the asymmetry of the optical paths in this system can make it difficult to provide in-focus positions of the imaging cameras and/or to maintain constant magnification. Other issues can also be raised due to the number and complexity of optical elements traversed in each of the beam paths.

Another method proposed by J. W. Schwider (German Patent No. DE 196,52,113,A1) uses a diffractive optical element to split a beam composed of mutually orthogonally polarized test and reference beams. Although diffractive elements appear attractive as beam splitters, actual diffractive components can be difficult and expensive to produce. This approach also involves a CCD camera whose resolution can affect the quality of the interferograms. A similar approach has been offered by Millerd, U.S. Pat. No. 6,304,330 and U.S. Pat. No. 6,552,808. Along with camera resolution issues, this method shares other drawbacks of the Schwider method, including sub-pixel alignment issues, and fixed at 90° degree. phase shifts.

Whatever the type, current interferometric systems are capable of either measuring large surface areas (from centimeters to meters) at low spatial resolution (millimeters), or of measuring very small surface areas (a few millimeters) at spatial high resolution (a few microns). Until now there has been no technology able to measure large surface areas at high resolutions in a reasonable amount of time, e.g. measuring the surface of a 300 mm semiconductor wafer at micron resolution in a few minutes. Typical instruments for large area measurements are Fizeau interferometers, while typical instruments for small surface areas are white light scanning microscopes.

SUMMARY OF THE INVENTION

The current invention is directed to an interferometric system that overcomes the aforesaid and other disadvantages of the prior art. More particularly, the present invention combines a simultaneous phase shifting interferometer with a mechanical scanner to translate a measured object. The simultaneous phase-shifting interferometer provides very short measurement time making the instrument largely insensitive to vibrations. To facilitate high speed of measurement and data transfer, a set of linear pixilated detectors is used in order to obtain a single line of phase data during a single measurement cycle. The entire surface of an object can be processed by means of scanning the object in a direction perpendicular to the orientation of the linear detectors and assembled together line-by-line using a software routine.

In a preferred embodiment the invention employs a Twyman-Green polarization type interferometer or a Fizeau polarization interferometer with orthogonally polarized test and reference wavefronts, and a simultaneous phase-shifting module for generating two or more phase-shifted interferograms. The current invention assumes a scanner to be a linear translation stage with precisely controlled motion and synchronized with data collection process in order to create a smooth and continuous image of the measured surface.

BRIEF DESCRIPTION OF THE DRAWINGS

Further features and advantages of the invention will be seen from the following detailed description, taken in conjunction with the accompanying drawings, wherein like numerals depict like parts, and wherein FIG. 1 is an example of interferogram showing interference patterns;

FIG. 2 is a plan view of a first embodiment of the invention; and

DETAILED DESCRIPTION OF PREFERRED EMBODIMENT

Figure 3:
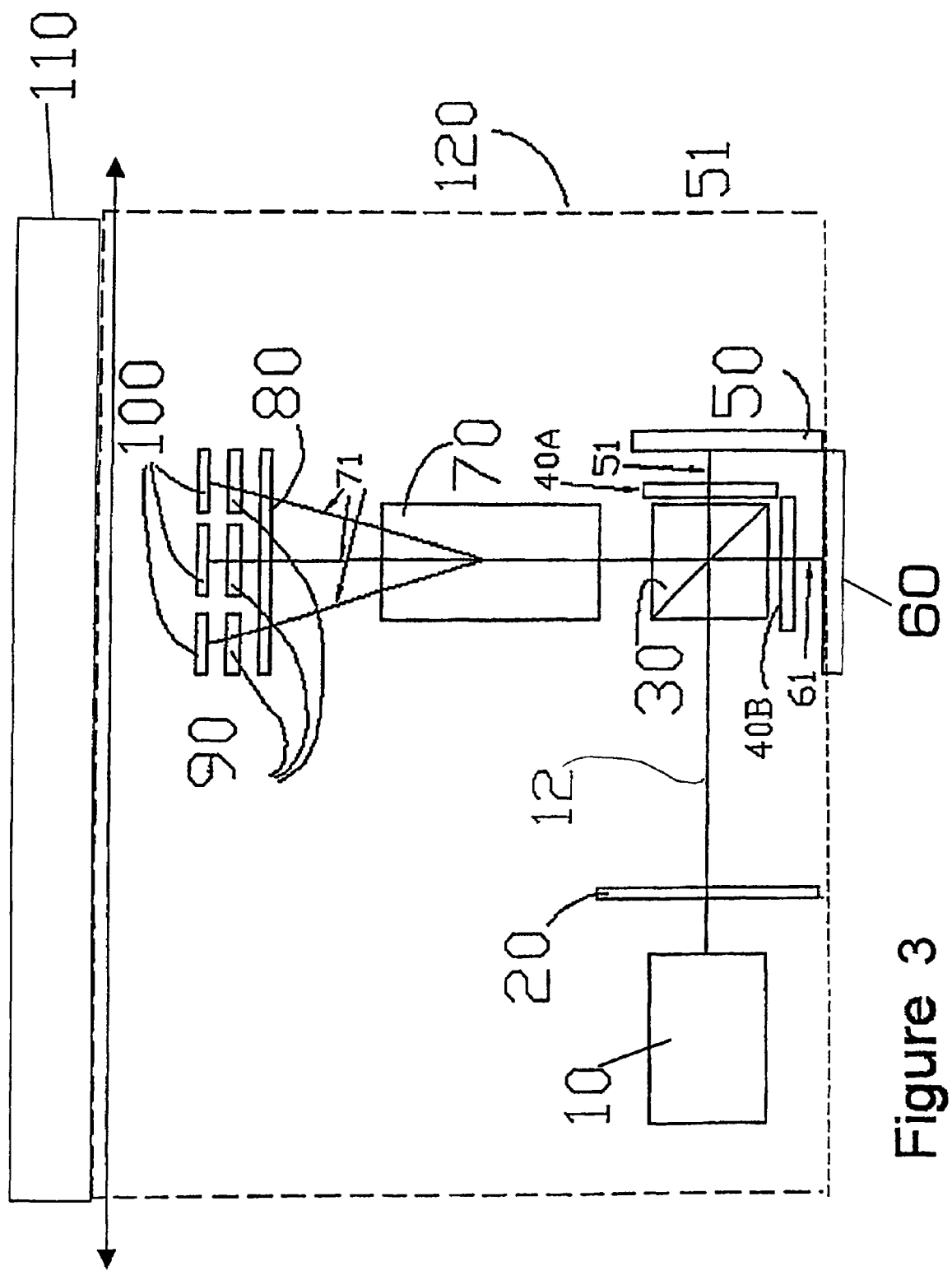
FIG. 3 is a plan view of an alternative embodiment of the invention.

In the preferred embodiment, a polarization version of Twyman-Green interferometer shown in FIG. 2 is adopted as a simultaneous phase shifting interferometer. A linearly polarized beam of light 12 from a coherent source 10 is expanded and collimated. The source 10 can be a laser, light emitting diode (LED), or a white light source. This beam is then directed towards a polarization type beam splitter 30 where it is split into a reference beam and a test beam. After passing through the beam splitter 30 both beams are mutually orthogonally polarized. Both beams then pass through quarter-wave plates 40a and 40b oriented in such a way that the polarizations of both beams are changed to circular. The reference beam is directed towards a reference surface 50 from which it reflects and propagates back through the quarter-wave plate 40a and the beam splitter into the interferometer. The test beam reflects from the measured surface 60 and returns into the interferometer through the quarter-wave plate 40b and the beam splitter 30.

After passing two times through the quarter-wave plates, both beams are linearly polarized with polarization direction rotated 90° with respect to the polarization direction of the illuminating beams and remain orthogonally polarized to each other. An imaging system creates a sharp image of measured surface 60 on the set of linear detectors 100. Both test and reference beams are split equally into multiple channels 71 by a non-polarizing beam splitter 70 located between the imaging element and the set of linear detectors 100. A combination of polarization elements 80 and 90 in front of each linear detector 100 introduces predetermined phase shifts, which are different for each of those detectors, so that the phase of the interfering beams can be calculated using the principle of phase shifting. Data acquisition into a computer from the set of linear detectors 100 are synchronized together, so that multiple interferograms are collected at the same instance, which makes the measurement significantly insensitive to vibrations.

A measured object 60 is mounted on a linear scanner 110 that is capable of moving the object in a direction perpendicular to the long axis of the linear detector arrays. Alternatively, as shown in FIG. 3, the linear scanner 110 may be attached to the interferometer 120 instead of the measurement object 60. In either case, the scanning speed is synchronized with the rate of data collection from the linear detectors and the measurement of the entire surface can be constructed by combining the consecutive measurements into a single surface map using a line-by-line reconstruction procedure.

Exposure time for collecting a single line of data can be very short—typically few tens of microseconds—and the data transfer rate ranges from 1 to 100 MPixels/s. This allows for scanning speeds from 2.5 to 250 mm/s assuming a typical size of a linear CCD detector of 4000 pixels and pixel size of 10×10 um. As a result an area of 200×200 mm. could be measured in between 4 and 400 s.

Various changes may be made in the invention without departing from the scope thereof. By way of example, the polarization version of the Twyman-Green interferometer can be replaced by any other interferometer in which reference and test beams are mutually orthogonally polarized. Also other devices capable of beam splitting for producing orthogonally polarized beams (such as polarization type cube or plate beam-splitters, Wollaston or Rochon prism, polarization beam displacer, combination of polarizers, etc) can be used instead of a typical polarization type beam splitter to obtain orthogonally polarized beams in any type of the interferometer.

And, the CCD imaging detector can be any device capable of producing a multitude of phase-shifted interferograms simultaneously. In particular the detector could be an arrangement of multiple linear detector arrays. The detector also could be a module composed of independent detector arrays, or a two-dimensional detector array where each row of the array is treated as a linear detector, or a two-dimensional detector array where each 2×2 set of pixels are composed of polarization optics for phase-shifting.

What is claimed is:

1. An optical measuring apparatus comprising:
    a polarization interferometer including a polarization beam splitter in which a polarized beam of light is split into orthogonally polarized reference and test beams;
    a non-polarizing beam splitter for splitting the test and reference beams equally into multiple channels;
    an array of detectors arranged in a line for creating a plurality of phase shifting interferograms
        wherein each of said detectors is covered with a common quarter wave plate and separate linear polarizers, each of said polarizers having different polarization directions, whereby a value of a phase shift between the test and reference beams for each channel can be controlled by adjusting angles of polarization direction; and
    a scanning device for moving the object in a direction perpendicular to a long axis of the detectors.

2. The apparatus of claim 1, wherein the detectors comprise pixilated detectors.

3. The apparatus of claim 1, wherein the interferometer is a Twyman-Green polarization interferometer.

4. The apparatus of claim 1, wherein the interferometer is a Fizeau polarization interferometer.

5. The apparatus of claim 2, wherein the pixilated detectors comprise linear CCD detectors.

6. The apparatus of claim 2, wherein the pixilated detectors comprise an array of three linear detectors.

7. The measuring apparatus of claim 1, wherein the moving stage is a linear translation stage.

8. The apparatus of claim 7, wherein rate of motion of the translation stage is synchronized with a rate of data collection.

9. The apparatus of claim 8, wherein phase information obtained from said linear detectors are combined together to create a 3D map of the measured surface.

10. The apparatus of claim 8, wherein phase information is collected by a computer and a 3D map is constructed using the computer.

11. An optical measuring apparatus comprising:
    a polarization interferometer including a polarization beam splitter in which a polarized beam of light is split into orthogonally polarized reference and test beams;
    a non-polarizing beam splitter for splitting the test and reference beams equally into multiple channels;
    an array of detectors arranged in a row for creating a plurality of phase shifting interferograms;
        wherein each of said detectors is covered with a common quarter wave plate and separate linear polarizers, each of said polarizers having different polarization directions, whereby a value of a phase shift between the test and reference beams for each channel can be controlled by adjusting angles of polarization direction; and
    a scanning device attached to the interferometer for moving the interferometer in a direction perpendicular to a long axis of the detectors.

12. The apparatus of claim 11, wherein the detectors comprise pixilated detectors.

13. The apparatus of claim 11, wherein the interferometer is a Twyman-Green polarization interferometer.

14. The apparatus of claim 11, wherein the interferometer is a Fizeau polarization interferometer.

15. The apparatus of claim 12, wherein the pixilated detectors comprise linear CCD detectors.

16. The apparatus of claim 12, wherein the pixilated detectors comprise an array of three linear detectors.

17. The measuring apparatus of claim 11, wherein the moving stage is a linear translation stage.

18. The apparatus of claim 17, wherein rate of motion of the translation stage is synchronized with a rate of data collection.

19. The apparatus of claim 18, wherein phase information obtained from said linear detectors are combined together to create a 3D map of the measured surface.

20. The apparatus of claim 18, wherein phase information is collected by a computer and a 3D map is constructed using the computer.

* * * * *